US012548584B2

(12) United States Patent
Lim et al.

(10) Patent No.: US 12,548,584 B2
(45) Date of Patent: Feb. 10, 2026

(54) AUDIO SIGNAL ENCODING/DECODING METHOD CONTROLLING EXTRACTION AND RECONSTRUCTION OF SUB-BAND SIGNALS AND APPARATUS FOR PERFORMING THE SAME

(71) Applicants: Electronics and Telecommunications Research Institute, Daejeon (KR); The Trustees of Indiana University, Indianapolis, IN (US)

(72) Inventors: Woo-taek Lim, Sejong-si (KR); Seung Kwon Beack, Daejeon (KR); Inseon Jang, Daejeon (KR); Jongmo Sung, Daejeon (KR); Tae Jin Lee, Daejeon (KR); Byeongho Cho, Daejeon (KR); Minje Kim, Bloomington, IN (US); Darius Petermann, Bloomington, IN (US)

(73) Assignees: ELECTRONICS AND TELECOMMUNICATIONS RESEARCH INSTITUTE, Daejeon (KR); THE TRUSTEES OF INDIANA UNIVERSITY, Indianapolis, IN (US)

( * ) Notice: Subject to any disclaimer, the term of this patent is extended or adjusted under 35 U.S.C. 154(b) by 254 days.

(21) Appl. No.: 18/473,791

(22) Filed: Sep. 25, 2023

(65) Prior Publication Data

US 2024/0144943 A1 May 2, 2024

Related U.S. Application Data

(60) Provisional application No. 63/420,405, filed on Oct. 28, 2022.

(30) Foreign Application Priority Data

Aug. 9, 2023 (KR) ........................ 10-2023-0104109

(51) Int. Cl.
*G10L 21/038* (2013.01)
*G10L 19/038* (2013.01)
*G10L 25/18* (2013.01)

(52) U.S. Cl.
CPC .......... *G10L 21/038* (2013.01); *G10L 19/038* (2013.01); *G10L 25/18* (2013.01)

(58) Field of Classification Search
CPC ............................ G10L 19/038; G10L 21/038
See application file for complete search history.

(56) References Cited

U.S. PATENT DOCUMENTS 8,301,439 B2 * 10/2012 Kim ........................ G10L 19/02 704/226
2012/0146831 A1 * 6/2012 Eksler ................. H03M 7/3082 341/200

(Continued)

FOREIGN PATENT DOCUMENTS

KR 10-2021-0047614 4/2021

OTHER PUBLICATIONS

Shin, Seong-Hyeon, et al. "Audio coding based on spectral recovery by convolutional neural network." ICASSP 2019-2019 IEEE International Conference on Acoustics, Speech and Signal Processing (ICASSP). IEEE, 2019. (Year: 2019).*

(Continued)

*Primary Examiner* — Shaun Roberts
(74) *Attorney, Agent, or Firm* — KILE PARK REED & HOUTTEMAN PLLC

(57) ABSTRACT

An audio signal encoding/decoding method and an apparatus for performing the same are disclosed. The audio signal encoding method includes obtaining a full-band input signal, extracting a first feature vector corresponding to a first sub-band signal and a second feature vector corresponding to a second sub-band signal using an encoder neural network (Continued)

100 including a plurality of encoding layers, generating a first code vector corresponding to the first feature vector and a second code vector corresponding to the second feature vector by compressing the first feature vector and the second feature vector, and generating a bitstream by quantizing the first code vector and the second code vector.

16 Claims, 5 Drawing Sheets

(56) References Cited

U.S. PATENT DOCUMENTS

| | | | | |
|---|---|---|---|---|
| 2018/0082692 | A1* | 3/2018 | Khoury | G10L 19/028 |
| 2021/0005209 | A1* | 1/2021 | Beack | G10L 21/038 |
| 2021/0120355 | A1 | 4/2021 | Kim et al. | |
| 2022/0005487 | A1 | 1/2022 | Sung et al. | |
| 2023/0013370 | A1* | 1/2023 | Li | G10L 21/02 |
| 2023/0019128 | A1* | 1/2023 | Zeghidour | G10L 25/30 |
| 2023/0154474 | A1* | 5/2023 | Feng | G10L 19/167 704/500 |
| 2023/0229892 | A1* | 7/2023 | Biswas | G10L 19/26 704/500 |
| 2023/0326476 | A1* | 10/2023 | Andreev | G06N 3/0475 |

OTHER PUBLICATIONS

Petermann et al., "Native Multi-Band Audio Coding Within Hyper-Autoencoded Reconstruction Propagation Networks", 6 total pages.

Petermann et al., "Harp-Net: Hyper-Autoencoded Reconstruction Propagation for Scalable Neural Audio Coding", IEEE, 2021, 5 total pages.

* cited by examiner

AUDIO SIGNAL ENCODING/DECODING METHOD CONTROLLING EXTRACTION AND RECONSTRUCTION OF SUB-BAND SIGNALS AND APPARATUS FOR PERFORMING THE SAME

CROSS-REFERENCE TO RELATED APPLICATION

This application claims the benefit of U.S. Provisional Application No. 63/420,405 filed on Oct. 28, 2022, in the U.S. Patent and Trademark Office, and claims the benefit of Korean Patent Application No. 10-2023-0104109 filed on Aug. 9, 2023, in the Korean Intellectual Property Office, the entire disclosures of which are incorporated herein by reference for all purposes.

BACKGROUND

1. Field of the Invention

One or more embodiments relate to an audio signal encoding/decoding method and an apparatus for performing the same.

2. Description of the Related Art

Spectral sub-bands may not have the same perceptual relevance. In audio coding, in order to efficiently perform bitrate assignment and signal reconstruction, a coding method that independently controls sub-band signals of an original full-band signal may be needed.

The above description is information the inventor(s) acquired during the course of conceiving the present disclosure, or already possessed at the time, and is not necessarily art publicly known before the present application was filed.

SUMMARY

An embodiment may improve coding quality by independently controlling reconstruction and bitrate allocation for a core band signal and a high band signal of an original full-band signal.

However, technical aspects are not limited to the foregoing aspects, and there may be other technical aspects.

According to an aspect, there is provided an audio signal encoding method including obtaining a full-band input signal, extracting a first feature vector corresponding to a first sub-band signal and a second feature vector corresponding to a second sub-band signal from the full-band input signal using an encoder neural network including a plurality of encoding layers, generating a first code vector corresponding to the first feature vector and a second code vector corresponding to the second feature vector by compressing the first feature vector and the second feature vector, and generating a bitstream by quantizing the first code vector and the second code vector.

The first sub-band signal may include a high band signal of the full-band input signal, and the second sub-band signal may include a down-sampled core band signal of the full-band input signal.

Each of the plurality of encoding layers may be configured to encode an output of a previous encoding layer.

The extracting of the first feature vector corresponding to the first sub-band signal and the second feature vector corresponding to the second sub-band signal may include extracting an output of an intermediate encoding layer among the plurality of encoding layers as the first feature vector and extracting an output of a last encoding layer among the plurality of encoding layers as the second feature vector.

Each of the plurality of encoding layers may include a 1-dimensional convolutional layer.

Among the plurality of encoding layers, remaining encoding layers excluding one or more encoding layers located after the intermediate encoding layer may have a same stride value, and the one or more encoding layers may have a greater stride value than the remaining encoding layers.

A stride value of the remaining encoding layers may be 1.

According to another aspect, there is provided an audio signal decoding method including obtaining a reconstructed first feature vector corresponding to a first sub-band signal of an original full-band signal and a reconstructed second feature vector corresponding to a second sub-band signal of the original full-band signal, reconstructing the second sub-band signal based on the reconstructed second feature vector, reconstructing the first sub-band signal based on the reconstructed first feature vector and the reconstructed second feature vector, and reconstructing the original full-band signal based on the reconstructed first sub-band signal and the reconstructed second sub-band signal.

The first sub-band signal may include a high band signal of the original full-band signal, and the second sub-band signal may include a down-sampled core band signal of the original full-band signal.

The reconstructing of the second sub-band signal may include encoding the reconstructed second feature vector using a decode neural network including a plurality of decoding layers, and each of the plurality of decoding layers may be configured to encode an output of a previous decoding layer.

The reconstructing of the first sub-band signal may include encoding the reconstructed first feature vector and the reconstructed second feature vector using a decoder neural network including a plurality of decoding layers, each of the plurality of decoding layers may be configured to encode an output of a previous decoding layers, and among the plurality of decoding layers, an intermediate decoding layer may be configured to encode an output of a previous decoding layer using the reconstructed second feature vector.

According to another aspect, there is provided an apparatus for encoding an audio signal, the apparatus including a memory configured to store instructions and a processor electrically connected to the memory and configured to execute the instructions. When the instructions are executed by the processor, the processor may be configured to perform a plurality of operations. The plurality of operations may include obtaining a full-band input signal, extracting a first feature vector corresponding to a first sub-band signal and a second feature vector corresponding to a second sub-band signal from the full-band input signal using an encoder neural network including a plurality of encoding layers, generating a first code vector corresponding to the first feature vector and a second code vector corresponding to the second feature vector by compressing the first feature vector and the second feature vector, and generating a bitstream by quantizing the first code vector and the second code vector.

The first sub-band signal may include a high band signal of the full-band input signal, and the second sub-band signal may include a down-sampled core band signal of the full-band input signal.

Each of the plurality of encoding layers may be configured to encode an output of a previous encoding layer.

The extracting of the first feature vector corresponding to the first sub-band signal and the second feature vector corresponding to the second sub-band signal may include extracting an output of an intermediate encoding layer among the plurality of encoding layers as the first feature vector and extracting an output of a last encoding layer among the plurality of encoding layers as the second feature vector.

Each of the plurality of encoding layers may include a 1-dimensional convolutional layer.

Among the plurality of encoding layers, remaining encoding layers excluding one or more encoding layers located after the intermediate encoding layer may have a same stride value, and the one or more encoding layers may have a greater stride value than the remaining encoding layers.

A stride value of the remaining encoding layers may be 1.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
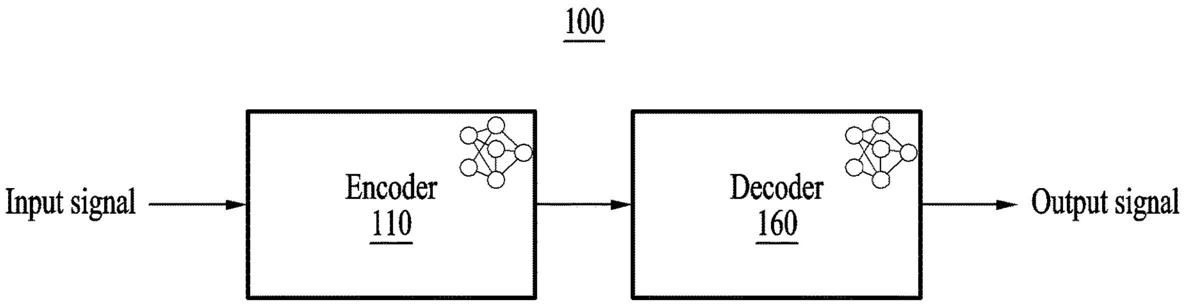
FIG. 1 is a diagram illustrating an encoder and a decoder according to an embodiment.

The following detailed structural or functional description is provided as an example only and various alterations and modifications may be made to the embodiments. Accordingly, the embodiments are not to be construed as limited to the disclosure and should be understood to include all changes, equivalents, or replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that, if one component is described as being "connected," "coupled," or "joined" to another component, a third component may be "connected," "coupled," and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/comprising" and/or "includes/including" when used herein, specify the presence of stated features, integers, steps, operations, elements, components or combinations thereof, but do not preclude the presence or addition of one or more other features, integers, steps, operations, elements, components or combinations thereof.

Unless otherwise defined, all terms, including technical and scientific terms, used herein have the same meaning as commonly understood by one of ordinary skill in the art to which the present disclosure pertains. Terms, such as those defined in commonly used dictionaries, should be construed to have meanings matching with contextual meanings in the relevant art and the present disclosure, and are not to be construed to have an ideal or excessively formal meaning unless otherwise defined herein.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more of functions. For example, according to an example, the module may be implemented in a form of an application-specific integrated circuit (ASIC).

The term "unit" used herein may refer to a software or hardware component, such as a field-programmable gate array (FPGA) or an ASIC, and the "unit" performs predefined functions. However, "unit" is not limited to software or hardware. The "unit" may be configured to reside on an addressable storage medium or configured to operate one or more of processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate one or more of central processing units (CPUs) within a device or a security multimedia card. In addition, "unit" may include one or more of processors.

Hereinafter, the embodiments are described in detail with reference to the accompanying drawings. When describing the embodiments with reference to the accompanying drawings, like reference numerals refer to like elements and a repeated description related thereto will be omitted.

FIG. 1 is a diagram illustrating an encoder and a decoder according to an embodiment.

Referring to FIG. 1, according to an embodiment, a coding system 100 may include an encoder 110 and a decoder 160. The encoder 110 may encode an input audio signal using an encoder neural network and output a bitstream. The input audio signal may be a full-band time domain signal. The encoder 110 is described in detail with reference to FIGS. 2 to 4.

The decoder 160 may receive the bitstream from the encoder 110 and output a reconstructed signal corresponding to the input audio signal by decoding the encoded signal using a decoder neural network. The decoder 160 is described in detail with reference to FIGS. 2, 3, and 5.

Figure 2:
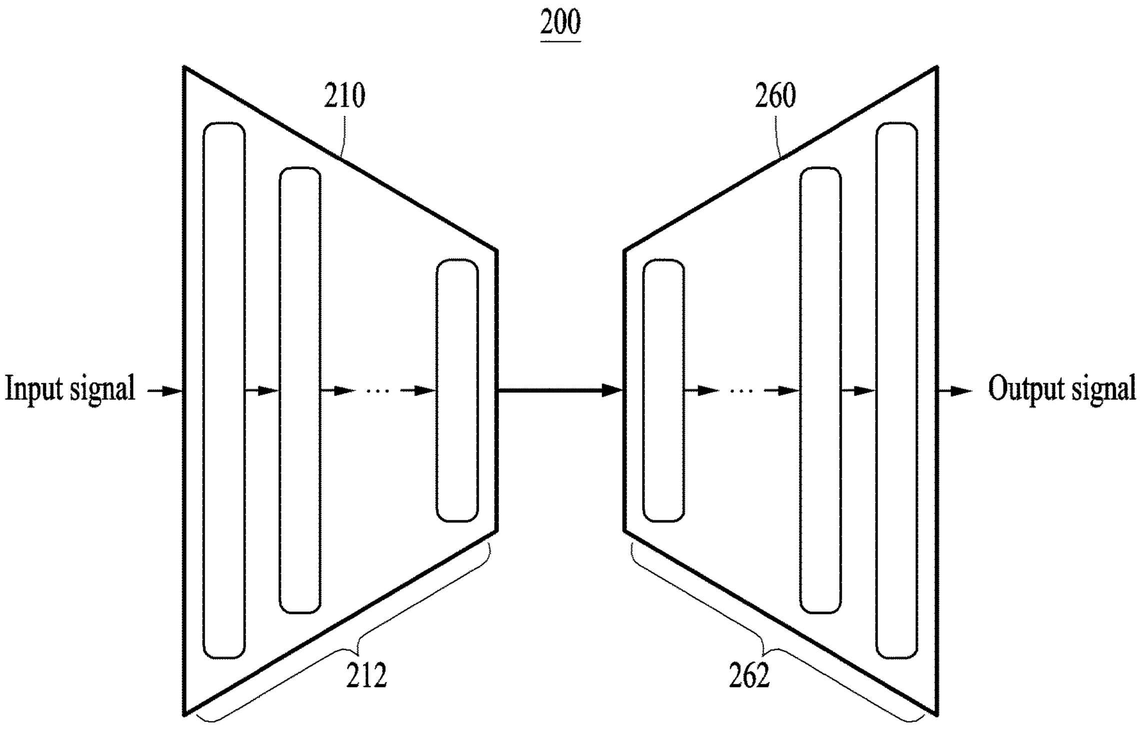
FIG. 2 is a diagram illustrating an autoencoder according to an embodiment.

FIG. 2 is a diagram illustrating an autoencoder according to an embodiment.

Referring to FIG. 2, according to an embodiment, an autoencoder 200 may include an encoder 210 and a decoder 260.

The encoder 210 may include a plurality of encoding layers 212. The encoder 210 may encode an input signal by training a hidden feature of the input signal using the plurality of encoding layers 212 (e.g., 1-dimensional convolutional layers) as expressed by Equation 1.

$$x^{(L)} = \mathcal{F}_{enc}(x) = f_{enc}^{(L)} \circ f_{enc}^{(L-1)} \circ \ldots \circ f_{enc}^{(1)}(x) \quad \text{[Equation 1]}$$

In Equation 1, $x$ may denote the input signal, L may denote the number of the plurality of encoding layers 212, $x^{(L)}$ may denote a feature vector, and $f_{enc}$ may denote the plurality of encoding layers or an encoding function of the plurality of encoding layers.

The encoder 210 may obtain a quantized feature vector (e.g., a bitstring) by applying a quantization function to a feature vector. The quantization function may obtain the quantized feature vector by assigning floating-point values of the feature vector to a finite set (e.g., 32 centroids for a 5-bit system) of quantization bins. The encoder 210 may compress the quantized feature vector through entropy coding such as Huffman coding.

The decoder 260 may include a plurality of decoding layers 262. The decoder 260 may dequantize the quantized feature vector as expressed by Equation 2 and may reconstruct the input signal by decoding a recovered feature vector in stages using the plurality of decoding layers 262.

$$x \approx \bar{x} \leftarrow \mathcal{F}_{dec}(x) = f_{dec}^{(1)} \circ \ldots \circ f_{dec}^{(L-1)} \circ f_{dec}^{(L)} \circ Q^{-1}(z) \quad \text{[Equation 2]}$$

In Equation 2, $z$ may denote the quantized feature vector (e.g., a bitstring), $x$ may denote the input signal (e.g., an original signal), $\bar{x}$ may denote a reconstructed input signal, and $f_{dec}$ may denote the plurality of decoding layers or a decoding function of the plurality of decoding layers. The decoding layers may correspond to the encoding layers. For example, the last decoding layer of the decoder 260 may correspond to the first encoding layer of the encoder 210.

Figure 3:
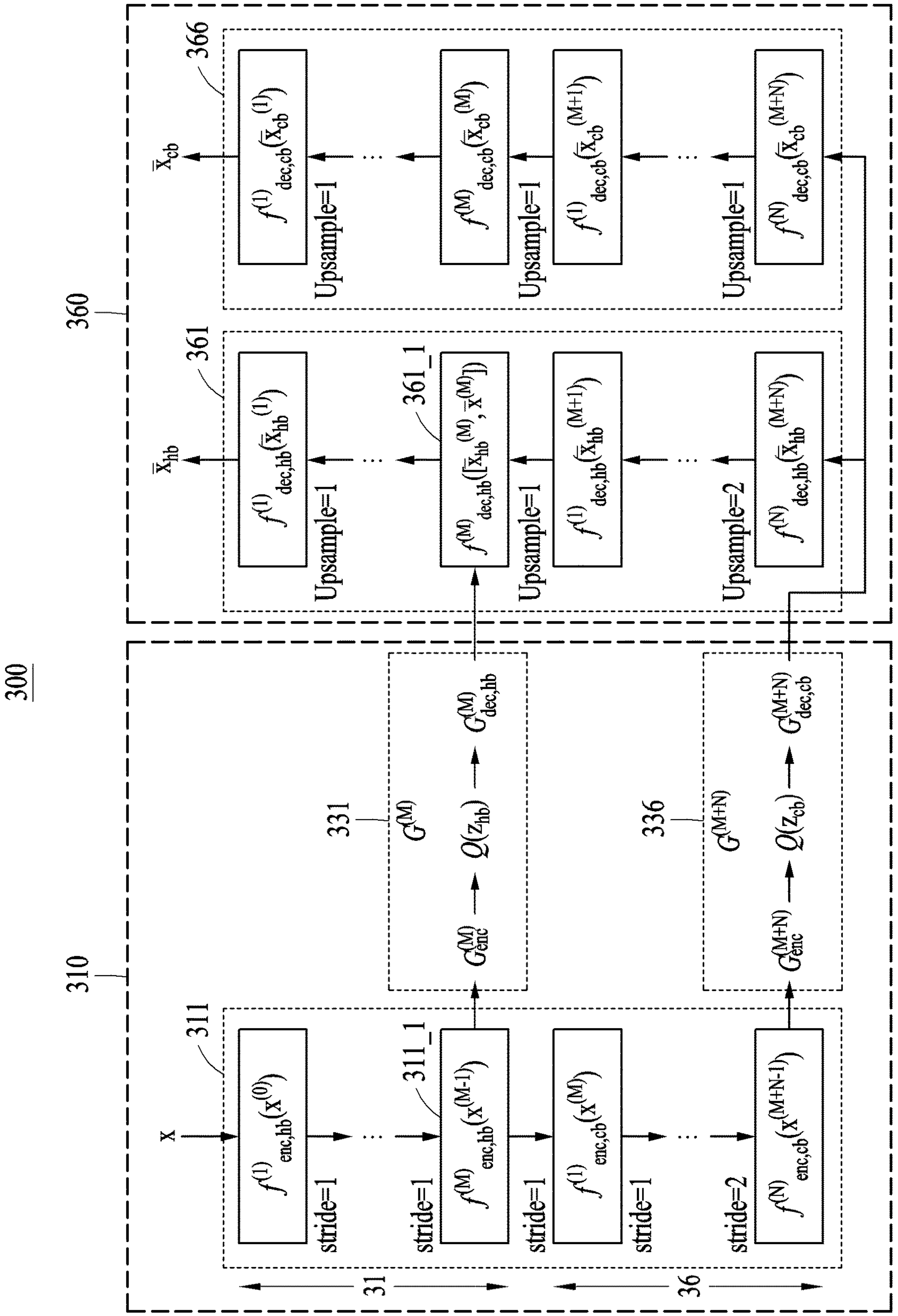
FIG. 3 is a diagram illustrating an encoder neural network and a decoder neural network according to an embodiment.

FIG. 3 is a diagram illustrating an encoder neural network and a decoder neural network according to an embodiment.

Referring to FIG. 3, according to an embodiment, a neural network-based coding system 300 may include an encoder 310 (e.g., the encoder 110 of FIG. 1) and a decoder 360 (e.g., the decoder 160 of FIG. 1).

The encoder 310 may encode an input signal ($x$) using an encoder neural network 311 including a plurality of encoding layers (e.g., 1-dimensional convolutional layers). The input signal ($x$) may be a full-band input time domain signal. The input signal ($x$) may be defined as the sum of two sub-band signals as expressed by Equation 3.

$$x = x_{fb} \in \mathbb{R}^{T} = x_{hb} + \mathcal{U}(x_{cb}) \quad \text{[Equation 3]}$$

In Equation 3, a first sub-band signal ($x_{hb}$) may represent a high-pass filtered version of the input signal ($x$) and a second sub-band signal ($x_{cb}$) may represent a down-sampled version of the input signal ($x$). In an inference phase, the second sub-band signal may recover an original temporal resolution using interpolation-based up-sampling ($\mathcal{U}$). A reconstruction loss for neural network training may be calculated using the down-sampled version ($x_{cb}$).

The encoder neural network 311 may include two stages (e.g., a first stage 31 and a second stage 36) (e.g., cascaded stages).

The first stage 31 may include M (e.g., M is a natural number) encoding layers (e.g., 1-dimensional convolutional layers). The first encoding layer of the first stage 31 may receive the input signal ($x$), and each of the encoding layers of the first stage 31 may encode an output of a previous encoding layer in stages. During the encoding process of the first stage 31, a temporal dimension may remain unchanged due to the stride value (e.g., 1) and zero padding of the encoding layers of the first stage 31. Unlike the temporal dimension, a channel dimension may increase by the number of filters. A last encoding layer 311_1 (e.g., an intermediate encoding layer of the encoder neural network 311) of the first stage 31 may output a first feature vector ($x^{(M)}$) corresponding to a first sub-band signal ($x_{hb}$). The encoding layers of the first stage 31 may have the same stride value (e.g., 1).

The second stage 36 may include N (e.g., N is a natural number) encoding layers (e.g., 1-dimensional convolutional layers). The first encoding layer of the second stage 36 may receive the first feature vector ($x^{(M)}$) as an input. Each of the encoding layers of the second stage 36 may encode an output of a previous encoding layer in stages. Stride values of the encoding layers of the second stage 36 may differ from each other. For example, some of the encoding layers may have a first stride value (e.g., 1) and the others may have a second stride value (e.g., a natural number greater than 1). Due to the stride values of the encoding layers of the second stage 36, a decimating factor (or down-sampling ratio) may be expressed as shown in Equation 4 below.

$$\delta^{ds} = \prod_k \delta_k^{ds} \quad \text{[Equation 4]}$$

In Equation 4, $\delta^{ds}$ may denote a decimating factor ($\delta^{ds}$) of the second stage 36 and $$\delta_k^{ds}$$

may denote a stride of a participating layer k (e.g., an encoding layer).

The last encoding layer of the second stage 36 may output a second feature vector) ($x^{(M+N)}$) corresponding to a second sub-band signal ($x_{cb}$). The second feature vector ($x^{(M+N)}$) may lose high frequency contents corresponding to temporal decimation ($T/\delta^{ds}$) based on the decimating factor ($\delta^{ds}$) of the second stage 36. However, a temporal structure corresponding to the second sub-band signal ($x_{cb}$) may not be affected.

The encoder neural network 311 may compress information and transmit the information to the decoder 360 through an autoencoder-based skip connection using an autoencoder (e.g., skip autoencoders (e.g., a first skip autoencoder 331 and a second skip autoencoder 336). The first skip autoencoder 331 and the second skip autoencoder 336 may each include an encoder ($G_{enc}$), a decoder ($G_{dec}$), and a quantization module (Q).

The first skip autoencoder 331 may receive the first feature vector ($x^{(M)}$) as an input, and the second skip autoencoder 336 may receive the second feature vector ($x^{(M+N)}$) as an input. The encoder ($G_{enc}$) of each of the skip autoencoders (e.g., 331 and 336) may encode an input feature vector (e.g., the first feature vector ($x^{(M)}$) and the second feature vector ($x^{(M+N)}$)). The encoders ($G_{enc}$) may perform compression on the input feature vector, but the encoders ($G_{enc}$) may not perform down-sampling on the input feature vector. For example, the encoders ($G_{enc}$) may reduce a channel dimension to 1 as expressed by Equation 5 and Equation 6.

$$z_{hb} \in \mathbb{R}^{T\times 1} \leftarrow \mathcal{G}_{enc}^{(M)}(\mathcal{X}^{(M)}) \quad \text{[Equation 5]}$$

$$z_{cb} \in \mathbb{R}^{T/\delta\times 1} \leftarrow \mathcal{G}_{enc}^{(M+N)}(\mathcal{X}^{(M+1)}) \quad \text{[Equation 6]}$$

In Equation 5 and Equation 6, $z_{hb}$ may denote a first code vector corresponding to the first feature vector ($x^{(M)}$) and $z_{cb}$ may denote a second code vector corresponding to the second feature vector ($x^{(M+N)}$).

The skip autoencoders (e.g., 331 and 336) may decrease a data rate while maintaining a temporal resolution through channel reduction.

A quantization module (Q) of the first skip autoencoder 331 may perform a quantization process on the first code vector ($z_{hb}$), and a quantization module of the second skip autoencoder 336 may perform a quantization process on the second code vector ($z_{cb}$). The quantization module (Q) may assign learned centroids to each of the feature values of feature vectors (e.g., the first feature vector ($x^{(M)}$) and the second feature vector ($x^{(M+N)}$)) using a scalar feature assignment matrix. In an inference phase, the quantization module (Q) may perform a non-differentiable "hard" assignment (e.g., $z=A^{hard}c$) using the scalar feature assignment matrix ($A^{hard} \in \mathbb{R}^{I\times J}$). An i-th row of the scalar feature assignment matrix ($A^{hard}$) may be a one-hot vector that selects the closest centroid for an i-th feature. To circumvent a non-differential process, in a training phase, a soft version of an assignment matrix ($A^{soft}$) may be used. Due to the difference between the inference phase and the training phase, a backpropagation error may occur. The discrepancy between a soft assignment result and a hard assignment result may be handled by annealing a temperature factor ($\alpha$) through training iterations as expressed by Equation 7.

$$\bar{z}=A^{hard}c=\lim_{\alpha\to inf}A^{soft}c \quad \text{[Equation 7]}$$

When a feature vector and centroids are given, a distance matrix (e.g., $D \in \mathbb{R}^{I\times J}$) representing the absolute difference between each element of the feature vector and each of the centroids may be generated. A probabilistic vector for an i-th element of the feature vector may be derived as expressed by Equation 8.

$$A_{i,:}^{soft} = \text{softmax}(-\alpha D_{i,:}) \quad \text{[Equation 8]}$$

Code distribution for the first sub-band signal ($x_{hb}$) and the second sub-band signal ($x_{cb}$), the number of learned centroids, and/or bitrates may be individually learned and controlled.

A decoder ($G_{dec}$) of the first skip autoencoder 331 may reconstruct the first feature vector ($x^{(M)}$) by decoding a quantized first code vector ($\bar{z}_{hb}$), and a decoder ($G_{dec}$) of the second skip autoencoder 336 may reconstruct the second feature vector ($x^{(M+N)}$) by decoding a quantized second code vector ($\bar{z}_{cb}$).

The decoder 360 may reconstruct the first sub-band signal ($x_{hb}$) using the first decoder neural network 361 and reconstruct the second sub-band signal ($x_{cb}$) using the second decoder neural network 366. The first decoder neural network 361 and the second decoder neural network 366 may each include a plurality of decoding layers. Each of the plurality of decoding layers may decode an output of a previous decoding layer.

The first decoder neural network 361 may use nearest-neighbors-based up-sampling to compensate for the loss of temporal resolution. In other words, the first decoder neural network 361 may perform a band extension (BE) process. The first decoder neural network 361 may increase a temporal resolution as expressed by Equation 9 through up-sampling.

$$\delta^{us} = \prod_k \delta_k^{us} \quad \text{[Equation 9]}$$

In Equation 9, $$\delta_k^{us}$$

may denote a scaling factor of a participating layer k (e.g., a decoding layer).

An intermediate decoding layer 361_1 of the first decoder neural network 361 may decode an output of a previous decoding layer using a reconstructed first feature vector output from the first skip autoencoder 331. For example, the reconstructed first feature vector ($\bar{x}^{(M)}$) and the output $$(\ddot{x}_{hb}^{(M)})$$

of the previous decoding layer may be concatenated along the channel dimension, and the concatenated vector $$([\ddot{x}_{hb}^{(M)}, \bar{x}^{(M)}])$$

may be input to the intermediate decoding layer 361_1. The intermediate decoding layer 361_1 may reduce the channel dimension of the input vector $$([\ddot{x}_{hb}^{(M)}, \bar{x}^{(M)}]).$$

For example, the intermediate decoding layer 361_1 may reduce the channel dimension from 2C (e.g., C is a natural number) to C. A decoding process of the intermediate decoding layer 361_1 may be expressed by Equation 10 below.

$$\ddot{\mathcal{X}}_{hb}^{(M-1)} \leftarrow f_{dec,hnb}^{(M)}([\ddot{\mathcal{X}}_{hb}^{(M)}, \bar{\mathcal{X}}^{(M)}]) \quad \text{[Equation 10]}$$

Decoding layers of the second decoder neural network 366 may reconstruct the second sub-band signal ($\hat{x}_{cb}$) by sharing the same depth with corresponding encoding layers (e.g., the encoding layers of the encoder neural network 311).

The encoder neural network 311 and/or the decoder neural networks (e.g., 361 and 366) may be trained through a loss function (e.g., an objective function) to reach target entropy of quantized code vectors ($\bar{z}_{hb}$, $\bar{z}_{cb}$).

A network loss (e.g., a loss function) may include a reconstruction loss (or reconstruction error) and an entropy loss as expressed by Equation 11.

$$\mathcal{L}=\mathcal{L}_{br}+\mathcal{L}_{recons} \quad \text{[Equation 11]}$$

In Equation 11, $\mathcal{L}_{recons}$ may denote a reconstruction loss and $\mathcal{L}_{br}$ may denote an entropy loss.

The reconstruction loss may be measured based on a time domain loss and a frequency domain loss. For example, the reconstruction loss may be a negative signal-to-noise ratio (SNR) and L1 norm for log magnitudes of short-time Fourier transform (STFT). The reconstruction loss may be represented as a weighted sum together with weights (e.g., blending weights) as expressed by Equation 12.

$$\mathcal{L}_{recons}=\Sigma_{b\in\{cb,hb\}}\Sigma_{d\in\{SNR,STFT\}}\lambda_{b,d}\mathcal{L}_{b,d} \quad \text{[Equation 12]}$$

Entropy (e.g., empirical entropy) of the quantized feature vectors ($\bar{z}_{hb}$, $\bar{z}_{cb}$) may be calculated by observing the assignment frequency of each centroid for multiple feature vectors. As a result, an empirical entropy estimate of the coding system may be calculated as expressed by Equation 13.

$$\overline{H} = -\sum_{j=1}^{J}\bar{p}_j\log_2(\bar{p}_j) \quad \text{[Equation 13]}$$

In Equation 13, $\bar{p}_j$ may denote an assignment probability for centroid j.

A code dimension (I) and a frame rate (F) may be considered, as expressed by Equation 14 below, to convert an entropy estimate ($\overline{H}$) to a lower bound of a bitrate counterpart ($\overline{B}$).

$$\overline{B}=FI\overline{H} \quad \text{[Equation 14]}$$

A bitrate of the coding system may be normalized by a band-specific entropy loss. The band-specific entropy loss may be calculated as expressed by Equation 15.

$$\mathcal{L}_{br}=\lambda_{br}\Sigma_{b\in\{cb,hb\}}|B_b-\overline{B}_b| \quad \text{[Equation 15]}$$

In Equation 15, $\overline{B}_b$ may denote a bitrate estimated from a band-specific code vector, $B_b$ may denote a band-specific target bitrate, and $\lambda_{br}$ may denote a weight for controlling a contribution of an entropy loss to the network loss.

Figure 4:
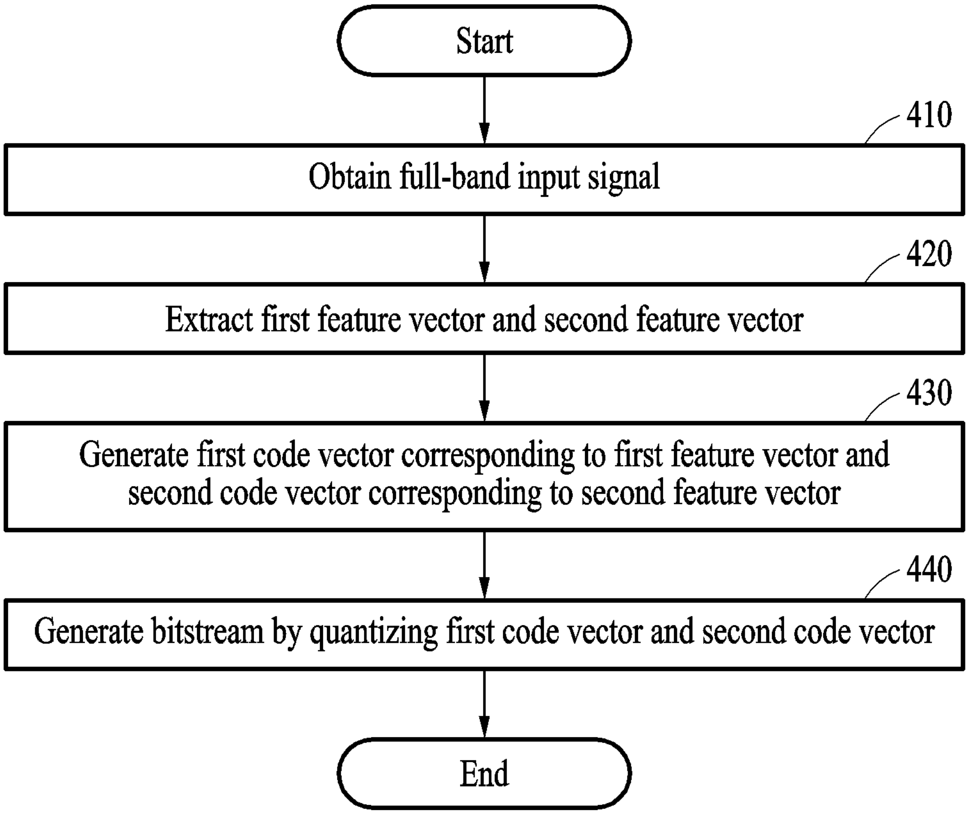
FIG. 4 is a flowchart illustrating an operation of an encoder according to an embodiment.

FIG. 4 is a flowchart illustrating an operation of an encoder according to an embodiment.

Referring to FIG. 4, according to an embodiment, operations 410 to 440 may be sequentially performed, however, embodiments are not limited thereto. For example, two or more operations may be performed in parallel. Operations 410 to 440 may be substantially the same as the operations of the encoder (e.g., the encoder 110 of FIG. 1 and the encoder 310 of FIG. 3) described with reference to FIGS. 1 to 3. Accordingly, further description thereof is not repeated herein.

In operation 410, the encoder 110, 310 may obtain a full-band input signal (e.g., the full-band input signal of FIG. 3).

In operation 420, the encoder 110, 310 may extract a first feature vector corresponding to a first sub-band signal and a second feature vector corresponding to a second sub-band signal from the full-band input signal using an encoder neural network (e.g., the encoder neural network 311 of FIG. 3) including a plurality of encoding layers.

In operation 430, the encoder 110, 310 may generate a first code vector corresponding to the first feature vector and a second code vector corresponding to the second feature vector by compressing the first feature vector and the second feature vector.

In operation 440, the encoder 110, 310 may generate a bitstream by quantizing the first code vector and the second code vector.

Figure 5:
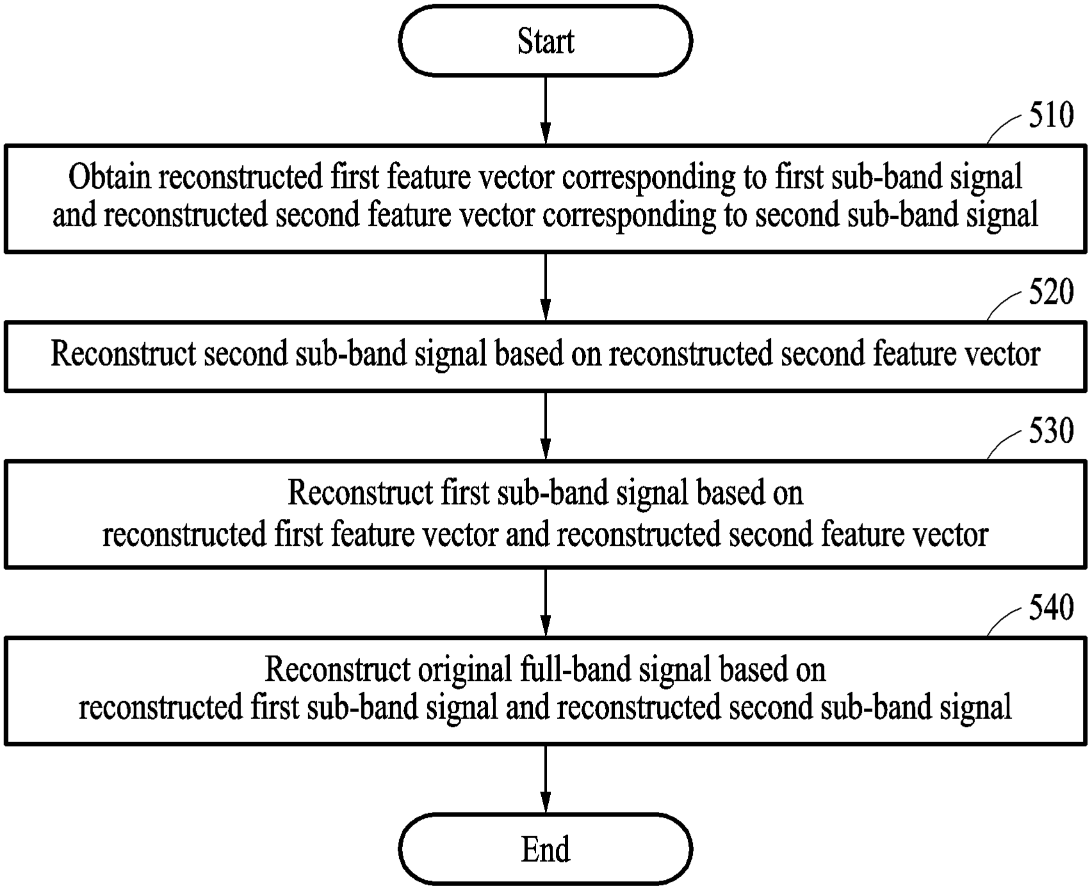
FIG. 5 is a flowchart illustrating an operation of a decoder according to an embodiment.

FIG. 5 is a flowchart illustrating an operation of a decoder according to an embodiment.

Referring to FIG. 5, according to an embodiment, operations 510 and 520 may be sequentially performed, however, embodiments are not limited thereto. For example, operation 530 may be performed later than operation 520, or operations 520 and 530 may be performed in parallel. Operations 510 to 540 may be substantially the same as the operations of the decoder (e.g., the decoder 160 of FIG. 1 and the decoder 360 of FIG. 3) described with reference to FIGS. 1 to 3. Accordingly, further description thereof is not repeated herein.

In operation 510, the decoder 160, 360 may obtain a reconstructed first feature vector corresponding to a first sub-band signal of an original full-band signal and a reconstructed second feature vector corresponding to a second sub-band signal of the original full-band signal.

In operation 520, the decoder 160, 360 may reconstruct the second sub-band signal based on the reconstructed second feature vector.

In operation 530, the decoder 160, 360 may reconstruct the first sub-band signal based on the reconstructed first feature vector and the reconstructed second feature vector.

In operation 540, the decoder 160, 360 may reconstruct the original full-band signal based on the reconstructed first sub-band signal and the reconstructed second sub-band signal.

Figure 6:
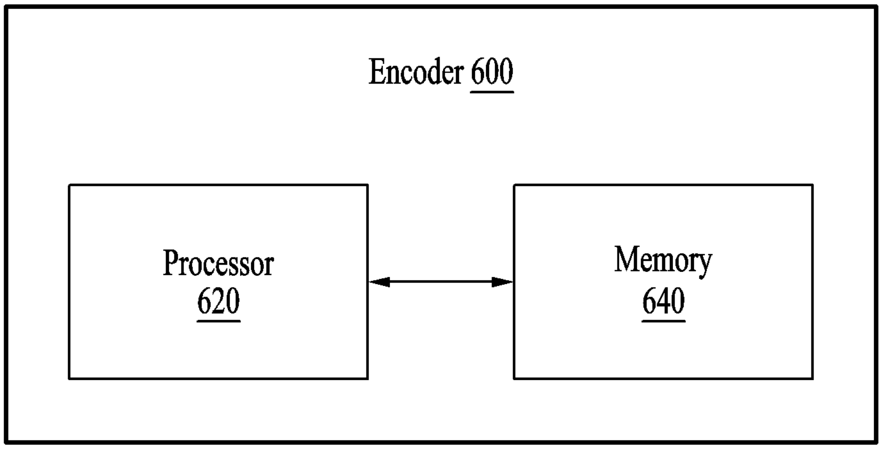
FIG. 6 is a schematic block diagram illustrating an encoder according to an embodiment.

FIG. 6 is a schematic block diagram illustrating an encoder according to an embodiment.

Referring to FIG. 6, according to an embodiment, an encoder 600 (e.g., the encoder 110 of FIG. 1, the encoder 210 of FIG. 2, and the encoder 310 of FIG. 3) may include a memory 640 and a processor 620.

The memory 640 may store instructions (or programs) executable by the processor 620. For example, the instructions may include instructions for executing an operation of the processor 620 and/or instructions for executing an operation of each component of the processor 620.

The memory 640 may include one or more computer-readable storage media. The memory 640 may include non-volatile storage elements (e.g., a magnetic hard disc, an optical disc, a floppy disc, flash memory, electrically programmable read-only memory (EPROM), and electrically erasable and programmable read-only memory (EEPROM)).

The memory 640 may be a non-transitory medium. The term "non-transitory" may indicate that a storage medium is not embodied in a carrier wave or a propagated signal. However, the term "non-transitory" should not be interpreted to mean that the memory 640 is non-movable.

The processor 620 may process data stored in the memory 640. The processor 620 may execute computer-readable code (e.g., software) stored in the memory 640 and instructions triggered by the processor 620.

The processor 620 may be a hardware-implemented data processing device having a circuit that is physically structured to execute desired operations. For example, the desired operations may include code or instructions included in a program.

The hardware-implemented data processing device may include, for example, a microprocessor, a CPU, a processor core, a multi-core processor, a multiprocessor, an ASIC, and an FPGA.

Operations performed by the processor 620 may be substantially the same as the operations of the encoders 110, 210, and 310 described with reference to FIGS. 1 to 4. Accordingly, further description thereof is not repeated herein.

Figure 7:
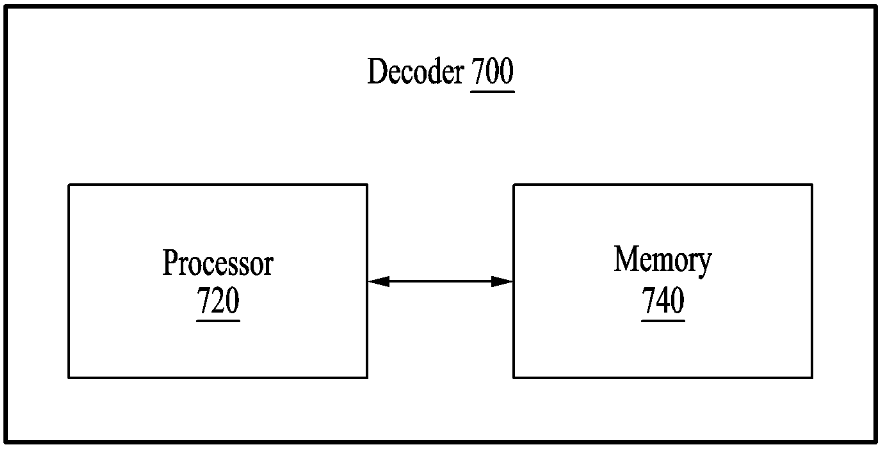
FIG. 7 is a schematic block diagram illustrating a decoder according to an embodiment.

FIG. 7 is a schematic block diagram illustrating a decoder according to an embodiment.

Referring to FIG. 7, according to an embodiment, a decoder 700 (e.g., the decoder 160 of FIG. 1, the decoder 260 of FIG. 2, and the decoder 360 of FIG. 3) may include a memory 740 and a processor 720.

The memory 740 may store instructions (or programs) executable by the processor 720. For example, the instructions may include instructions for executing an operation of the processor 720 and/or instructions for executing an operation of each component of the processor 720.

The memory 740 may include one or more computer-readable storage media. The memory 740 may include non-volatile storage elements (e.g., a magnetic hard disc, an optical disc, a floppy disc, flash memory, EPROM, and EEPROM).

The memory 740 may be a non-transitory medium. The term "non-transitory" may indicate that a storage medium is not embodied in a carrier wave or a propagated signal. However, the term "non-transitory" should not be interpreted to mean that the memory 540 is non-movable.

The processor 720 may process data stored in the memory 740. The processor 720 may execute computer-readable code (e.g., software) stored in the memory 740 and instructions triggered by the processor 720.

The processor 720 may be a hardware-implemented data processing device having a circuit that is physically structured to execute desired operations. For example, the desired operations may include code or instructions included in a program.

The hardware-implemented data processing device may include, for example, a microprocessor, a CPU, a processor core, a multi-core processor, a multiprocessor, an ASIC, and an FPGA.

Operations performed by the processor 720 may be substantially the same as the operations of the decoders 160, 260, and 360 described with reference to FIGS. 1 to 3 and 5. Accordingly, further description thereof is not repeated herein.

Figure 8:
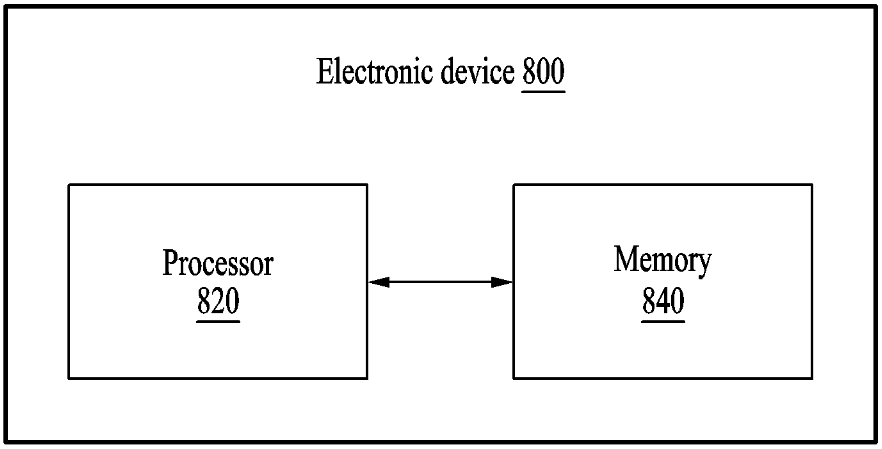
FIG. 8 is a schematic block diagram illustrating an electronic device according to an embodiment.

FIG. 8 is a schematic block diagram illustrating an electronic device according to an embodiment.

Referring to FIG. 8, according to an embodiment, an electronic device 800 may include a memory 840 and a processor 820.

The memory 840 may store instructions (or programs) executable by the processor 820. For example, the instructions may include instructions for executing an operation of the processor 820 and/or instructions for executing an operation of each component of the processor 820.

The memory 840 may include one or more computer-readable storage media. The memory 840 may include non-volatile storage elements (e.g., a magnetic hard disc, an optical disc, a floppy disc, flash memory, EPROM, and EEPROM).

The memory 840 may be a non-transitory medium. The term "non-transitory" may indicate that a storage medium is not embodied in a carrier wave or a propagated signal. However, the term "non-transitory" should not be interpreted to mean that the memory 540 is non-movable.

The processor 820 may process data stored in the memory 840. The processor 820 may execute computer-readable code (e.g., software) stored in the memory 840 and instructions triggered by the processor 820.

The processor 820 may be a hardware-implemented data processing device having a circuit that is physically structured to execute desired operations. For example, the desired operations may include code or instructions included in a program.

The hardware-implemented data processing device may include, for example, a microprocessor, a CPU, a processor core, a multi-core processor, a multiprocessor, an ASIC, and an FPGA.

Operations performed by the processor 820 may be substantially the same as the operations of the encoder (e.g., the encoder 110 of FIG. 1, the encoder 210 of FIG. 2, and the encoder 310 of FIG. 3) and the operations of the decoder (e.g., the decoder 160 of FIG. 1, the decoder 260 of FIG. 2, and the decoder 360 of FIG. 3) described with reference to FIGS. 1 to 5. Accordingly, further description thereof is not repeated herein.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor, or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software may also be distributed over network-coupled computer systems so that the software is stored and executed in a distributed fashion. The software and data may be stored in a non-transitory computer-readable recording medium.

The methods according to the embodiments may be recorded in non-transitory computer-readable media including program instructions to implement various operations of the embodiments. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, one of ordinary skill in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

What is claimed is:

1. An audio signal encoding method comprising:

obtaining a full-band input signal;

extracting a first feature vector corresponding to a first sub-band signal and a second feature vector corresponding to a second sub-band signal from the full-band input signal using an encoder neural network comprising a plurality of encoding layers;

generating a first code vector corresponding to the first feature vector and a second code vector corresponding to the second feature vector by compressing the first feature vector and the second feature vector; and generating a bitstream by quantizing the first code vector and the second code vector, and wherein among the plurality of encoding layers, remaining encoding layers excluding one or more encoding layers located after an intermediate encoding layer have a same stride value, and the one or more encoding layers have a greater stride value than the remaining encoding layers.

2. The audio signal encoding method of claim 1, wherein the first sub-band signal comprises a high band signal of the full-band input signal, and the second sub-band signal comprises a down-sampled core band signal of the full-band input signal.

3. The audio signal encoding method of claim 1, wherein each of the plurality of encoding layers is configured to encode an output of a previous encoding layer.

4. The audio signal encoding method of claim 3, wherein the extracting of the first feature vector corresponding to the first sub-band signal and the second feature vector corresponding to the second sub-band signal comprises:

extracting an output of the intermediate encoding layer among the plurality of encoding layers as the first feature vector; and extracting an output of a last encoding layer among the plurality of encoding layers as the second feature vector.

5. The audio signal encoding method of claim 4, wherein each of the plurality of encoding layers comprises a 1-dimensional convolutional layer.

6. The audio signal encoding method of claim 1, wherein a stride value of the remaining encoding layers is 1.

7. An audio signal decoding method comprising:

obtaining a reconstructed first feature vector corresponding to a first sub-band signal of an original full-band signal and a reconstructed second feature vector corresponding to a second sub-band signal of the original full-band signal;

reconstructing the second sub-band signal based on the reconstructed second feature vector using a decoder neural network comprising a plurality of decoding layers;

reconstructing the first sub-band signal based on the reconstructed first feature vector and the reconstructed second feature vector using the decoder neural network comprising a plurality of decoding layers; and reconstructing the original full-band signal based on a reconstructed first sub-band signal and a reconstructed second sub-band signal, and wherein among the plurality of decoding layers, remaining decoding layers excluding one or more decoding layers located after an intermediate decoding layer have a same upscaling factor, and the one or more decoding layers have a greater stride value than the remaining decoding layers.

8. The audio signal decoding method of claim 7, wherein the first sub-band signal comprises a high band signal of the original full-band signal, and the second sub-band signal comprises a down-sampled core band signal of the original full-band signal.

9. The audio signal decoding method of claim 7, wherein each of the plurality of decoding layers is configured to decode an output of a previous decoding layer, and among the plurality of decoding layers, the intermediate decoding layer is configured to decode an output of a previous decoding layer using the reconstructed second feature vector.

10. An apparatus for encoding an audio signal, the apparatus comprising:

a memory configured to store instructions; and a processor electrically connected to the memory and configured to execute the instructions, wherein, when the instructions are executed by the processor, the processor is configured to perform a plurality of operations, and wherein the plurality of operations comprises:

obtaining a full-band input signal;

extracting a first feature vector corresponding to a first sub-band signal and a second feature vector corresponding to a second sub-band signal from the full-band input signal using an encoder neural network comprising a plurality of encoding layers;

generating a first code vector corresponding to the first feature vector and a second code vector corresponding to the second feature vector by compressing the first feature vector and the second feature vector; and generating a bitstream by quantizing the first code vector and the second code vector, and wherein, among the plurality of encoding layers, remaining encoding layers excluding one or more encoding layers located after an intermediate encoding layer have a same stride value, and the one or more encoding layers have a greater stride value than the remaining encoding layers.

11. The apparatus of claim 10, wherein the first sub-band signal comprises a high band signal of the full-band input signal, and the second sub-band signal comprises a down-sampled core band signal of the full-band input signal.

12. The apparatus of claim 10, wherein each of the plurality of encoding layers is configured to encode an output of a previous encoding layer.

13. The apparatus of claim 12, wherein the extracting of the first feature vector corresponding to the first sub-band signal and the second feature vector corresponding to the second sub-band signal comprises:

extracting an output of the intermediate encoding layer among the plurality of encoding layers as the first feature vector; and extracting an output of a last encoding layer among the plurality of encoding layers as the second feature vector.

14. The apparatus of claim 13, wherein each of the plurality of encoding layers comprises a 1-dimensional convolutional layer.

15. The apparatus of claim 10, wherein a stride value of the remaining encoding layers is 1.

16. A non-transitory computer-readable storage medium storing instructions that, when executed by a processor, cause the processor to perform the audio signal encoding method of claim 1.

* * * * *